Dec. 28, 1926.

C. A. HUELSICK 1,612,124

HAND JACK

Filed March 30, 1925

INVENTOR.
CLIFFORD A. HUELSICK.
BY Harry Schroeder
ATTORNEYS.

Patented Dec. 28, 1926.

1,612,124

UNITED STATES PATENT OFFICE.

CLIFFORD A. HUELSICK, OF OAKLAND, CALIFORNIA, ASSIGNOR TO HARSHAW CORPORATION, OF OAKLAND, CALIFORNIA, A CORPORATION OF CALIFORNIA.

HAND JACK.

Application filed March 30, 1925. Serial No. 19,291.

My invention is a hand jack of a type in which two tubular members are slidable, one within the other, and have a series of annular grooves in which pivoted dogs may engage to hold the jack in adjusted position. Primarily, my jack is not designed as a lifting jack, but to secure the articles, pieces of mechanism, etc., to which they are engaged a fixed position apart. I preferably have a pair of dogs or pawls mounted on opposite sides of the jack, so that they may be conveniently gripped by the hand to disengage the dogs.

In one form of the jack, I form the internal tube with squared threads, and the pawls have pivoted segments with grooves to correspond with the threads so that when clamped, they will form the equivalent of a threaded nut, forming a type of hand operated screw jack. An example of the use to which the jack may be put, is as an automobile accessory and it may readily be positioned between the front seat and the clutch lever to hold the clutch thrown out.

My invention will be more clearly understood from the following description and drawings, in which:—

Figure 1:
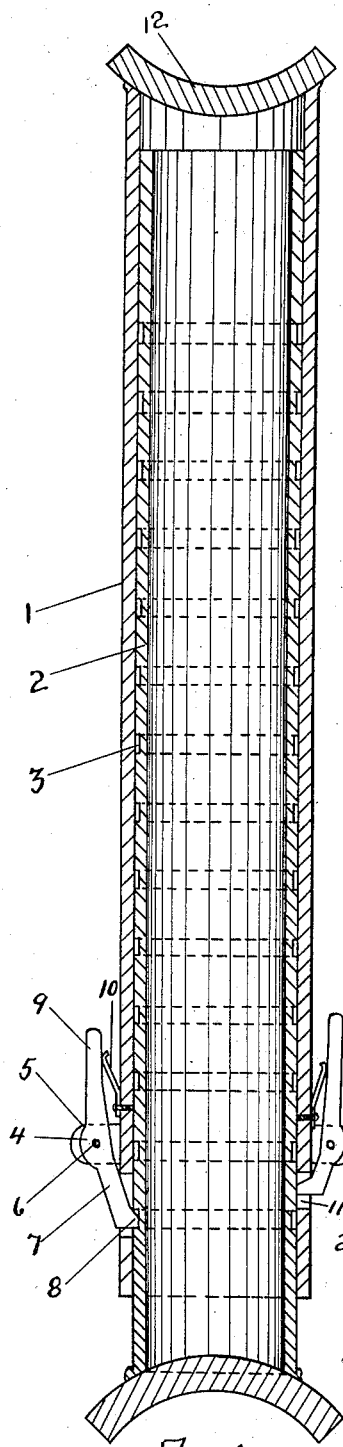
Figure 1 is a longitudinal section of one type of a hand jack, showing the tubular construction of telescoping tubes, having annular grooves on the inner tube, with which the pawls engage to hold the jack in adjusted position.

Referring particularly to Figure 1, the jack is formed with an outer tube 1 and an inner tube 2, telescoping inside the outer tube, and having a series of annular grooves 3 positioned along the length of the inner tube. A pair of pawls or dogs 4 are pivotally mounted on the outer tube, the construction shown being by a pair of lugs 5, having a pivot pin 6 therethrough, and a pivoted pawl 7, having a tooth 8 to engage in the grooves of the inner tube. A hand grip end 9 is pressed outwardly by a spring 10, secured to the outer tube and thereby presses the tooth of the dog inwardly. Slots 11 are formed in the outer tube, through which the pawls operate.

Any suitable engaging heads 12, which are shown as forming segments of a circle, are mounted on the end of each tube, and engage the devices to be held apart. These may be of any desired shape or construction and will preferably be made removable to engage different articles.

The manner of using the jack of Figure 1 is as follows:—Presuming it is desired to hold the clutch of an automobile thrown out, the clutch pedal would be depressed and the jack positioned between the front seat and the pedal. After the tubular sections are drawn out, the dogs engage the annular grooves and hold the jack extended. It will be noted that the pawls on opposite sides are staggered, so that a finer adjustment may be made. If it is desired to let the clutch in slowly, the pawl engaging a groove may be disengaged therefrom by the hand grip end 9, and the tubular sections allowed to telescope until the opposite pawl engages with the groove. Thus, a step by step movement may be made by pressing alternatively on the handle end of each pawl, thus allowing the clutch to be let in gradually. Other uses are manifest. For instance, it could be used to hold a car axle elevated after the axle has been lifted by the ordinary type of jack, and this type forms a convenient arrangement whereby the axle may be lowered step by step by operation of the staggered pawls.

Figure 2:
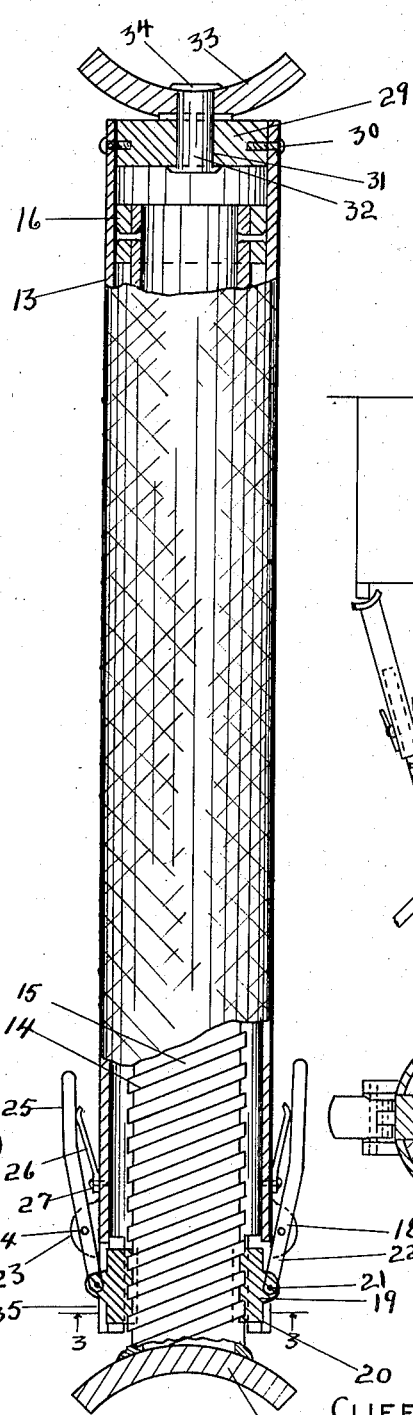
Figure 2 is a longitudinal section with partial elevation of a modified hand jack, in which the inner tube has squared threads formed thereon, and the pawls have grooves forming a nut for the screw threaded jack.
Figure 3:
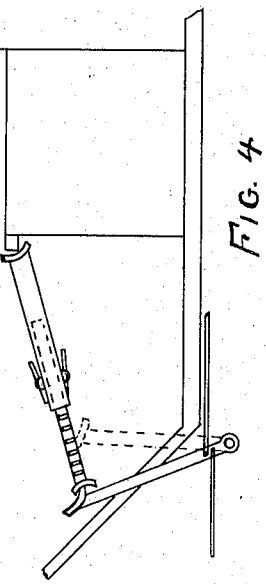
Figure 3 is a cross section of Figure 2 on the line 3—3 in the direction of the arrows.

Referring particularly to Figures 2 and 3, the jack comprises an outer tubular member 13, and an inner telescoping tube 14, shown with square threads 15, on one portion thereof. A ring 16 forms the bearing of the inner tube 14 at one end, and is made with a close sliding fit in the outer tubular member. A pair of segments 17 are secured to the outer end of the outer tube, and have a clearance for the threads on the inner tube. A pair of pawls 18 are constructed with segmental blocks 19 having grooves 20 cut in their inner surface to conform with the threads 15. These blocks are connected by a pivot pin 21 to a pawl lever 22. This latter is pivoted between lugs 23 by a pintle 24. The handle end 25 is pressed outwardly by a spring 26 secured to the outer tube 13 by rivets 27, or the like.

The screw threaded inner tube is preferably constructed with a fixed work engaging head 28, which is shown formed in a segment. The opposite end formed by the outer tube is closed by a disc 29 fastened by screws 30 in position, and having an aperture 31 with a stud 32 holding a swivelled segment 33. The stud is preferably riveted as indicated at 34. However, it is permissible to have a swivelled removable mounting so that different shapes of work engaging ends may be used. The blocks 19 are shown operating in slots 35, cut in the outer tube 13, but if desired, they could extend beyond the tube and be continued so that each will form substantially a half-nut.

Figure 4:
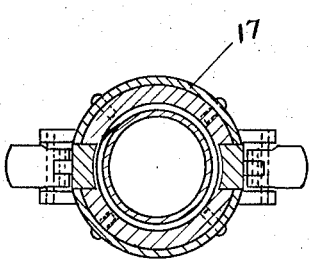
Figure 4 is a diagram showing the use of the jack holding a clutch pedal in its down or disengaged position.

The manner of using the jack of Figures 2 and 3 is as follows:—Presuming a clutch pedal is to be held in its down position, with the clutch thrown out, as shown in Figure 4, the handle ends 25 of the pawls would be pressed together so as to disengage the blocks 19 from the threads 15 of the telescoping tube 14, which may then be readily drawn outwardly. When the pedal is engaged and the jack braced between the front seat and the pedal, the pawls will be released so that the blocks will engage the threads and hold the jack in position. The outer tube 13 may then be turned by the hand to either press the clutch further out or let it in gradually. The outer surface of the tube 13 is preferably nurled, to afford a grip for the hands. With a device of this character, merely using the hands, a very considerable pressure may be exerted, say, for instance, to lift the axle of a car, or to let it down gradually.

My invention may be considerably modified to suit special circumstances and may be made of quite light material. I find that a satisfactory hand jack may be made by rolling the grooves in a tubular thin metal telescoping member. This construction may be used for either the annular grooves or the threads of Figure 2.

Having described my invention, what I claim is:—

A device of the type described comprising an outer sleeve, a swivel segment carried by one end of said outer sleeve, an exteriorly threaded inner tube slidably mounted in said outer sleeve, a bearing ring carried by the inner end of said inner sleeve and slidably engaging with said outer sleeve, a segment carried by the outer end of said inner sleeve, spring actuated means for engaging with said threads for holding said inner sleeve in adjusted position, said means being manually movable into inoperative position, said segment being adjustable with respect to said outer sleeve for different kinds of work.

In testimony whereof I affix my signature.

CLIFFORD A. HUELSICK.